US009166671B2

(12) United States Patent
Tanaka

(10) Patent No.: US 9,166,671 B2
(45) Date of Patent: Oct. 20, 2015

(54) COMMUNICATION SYSTEM, RELAY DEVICE, AND COMMUNICATION METHOD

(75) Inventor: Ryo Tanaka, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 157 days.

(21) Appl. No.: 14/233,572

(22) PCT Filed: May 18, 2012

(86) PCT No.: PCT/JP2012/062753
§ 371 (c)(1),
(2), (4) Date: Jan. 17, 2014

(87) PCT Pub. No.: WO2013/011735
PCT Pub. Date: Jan. 24, 2013

(65) Prior Publication Data
US 2014/0154971 A1 Jun. 5, 2014

(30) Foreign Application Priority Data

Jul. 20, 2011 (JP) ................................ 2011-159395

(51) Int. Cl.
*H04B 3/36* (2006.01)
*H04B 7/14* (2006.01)
*H04L 12/46* (2006.01)
*H04W 4/06* (2009.01)
*H04W 88/04* (2009.01)
*H04L 12/40* (2006.01)

(52) U.S. Cl.
CPC .............. *H04B 7/14* (2013.01); *H04L 12/4625* (2013.01); *H04W 4/06* (2013.01); *H04L 2012/40273* (2013.01); *H04W 88/04* (2013.01)

(58) Field of Classification Search
CPC ..... H04W 88/04; H04W 40/22; H04W 92/18; H04W 68/00; H04W 8/005; H04W 40/246; H04W 88/02

USPC ................. 455/7, 8, 11.1, 12.1, 13.1, 15, 18, 455/422.1, 403, 500, 517, 550.1, 445, 455/412.1, 507, 508, 514, 515, 426.1, 455/426.2, 518, 519; 370/310, 315, 328, 370/329

See application file for complete search history.

(56) References Cited

U.S. PATENT DOCUMENTS

| 7,912,597 B2 | 3/2011 | Yamada |
| 2008/0171511 A1* | 7/2008 | Sumita et al. ..................... 455/7 |

(Continued)

FOREIGN PATENT DOCUMENTS

| JP | A-2002-261790 | 9/2002 |
| JP | A-2002-274293 | 9/2002 |

(Continued)

OTHER PUBLICATIONS

Jul. 17, 2012 International Search Report issued in International Patent Application No. PCT/JP2012/062753.

*Primary Examiner* — Keith Ferguson
(74) *Attorney, Agent, or Firm* — Oliff PLC

(57) ABSTRACT

A communication system, a relay device, and a communication method are provided in a configuration where multiple communication devices are divided into multiple groups, a relay device is provided for each group, and the relay device relays data exchanges between groups. The data that is exchanged between a second relay device and an external wireless communication device is stored such that it is distributed among multiple databases of first relay units. Data received from the external communication device is stored in an individual region in the database of the first relay device and a data storage destination table in the second relay device is encrypted. If the first relay device stores data received from an ECU in the database, the second relay device is notified, and the second relay device updates the data storage destination table according to the notification.

14 Claims, 6 Drawing Sheets

(56) References Cited

U.S. PATENT DOCUMENTS

2010/0146034 A1  6/2010  Tanaka
2011/0053494 A1* 3/2011  Kobayakawa .................... 455/7

FOREIGN PATENT DOCUMENTS

| JP | A-2007-99145 | 4/2007 |
| JP | A-2009-33251 | 2/2009 |

* cited by examiner

| DATA TYPE | STORAGE REGION |
|---|---|
| WHEEL SPEED | COMMON REGION |
| STEERING ANGLE | COMMON REGION |
| OIL TEMPERATURE | INDIVIDUAL REGION (13a) |
| INTERIOR TEMPERATURE | INDIVIDUAL REGION (13b) |
| ⋮ | ⋮ |

| DATA | STORAGE DESTINATION |
|---|---|
| RECEIVED DATA A | FIRST RELAY DEVICE 1a |
| RECEIVED DATA B | FIRST RELAY DEVICE 1c |
| OIL TEMPERATURE | FIRST RELAY DEVICE 1a |
| RECEIVED DATA C | FIRST RELAY DEVICE 1b |
| RECEIVED DATA D | FIRST RELAY DEVICE 1a |
| INTERIOR TEMPERATURE | FIRST RELAY DEVICE 1b |
| WHEEL SPEED | COMMON REGION |
| ⋮ | ⋮ |

COMMUNICATION SYSTEM, RELAY DEVICE, AND COMMUNICATION METHOD

This application is the national phase of PCT International Application No. PCT/JP2012/062753 that has an International filing date of May 18, 2012 and designated the United States of America and claims priority to Japanese Patent App. No. JP 2011-159395 that was filed on Jul. 20, 2011. The disclosure of the prior applications is hereby incorporated by reference herein in their entirety.

BACKGROUND

A communication system that performs various processes by connecting multiple communication devices with a communication line and performing data exchange among the multiple communication devices is used in various fields. For example, in the field of vehicle-mounted LANs (Local Area Networks) that are installed in vehicles, multiple ECUs (Electronic Control Units) that each perform different processing are mounted on a vehicle. Due to the multiple ECUs exchanging data with each other, various functions are realized as a system. Communication devices have gained more functions and more advanced functions in order for systems to have more functions and more advanced functions, and this has been accompanied by an increase in the number of communication devices in a system and an increase in the amount of data exchanged between the communication devices. Thus the communication load has increased. Because of this, a configuration is commonly employed in which the communication devices are divided into multiple groups, multiple communication devices in a group are connected by a common communication line and data is exchanged as an increase in the communication load is suppressed by a relay device such as a gateway relaying the exchange of data between groups.

For example, JP 2002-261790A proposes a vehicle-mounted network system having a configuration in which multiple vehicle-mounted modules having standard interfaces and CPUs (Central Processing Units) that process information via the interface are connected to an information processing LAN on a vehicle, and a vehicle-mounted gateway integrates communication between the multiple vehicle-mounted modules, and the vehicle interior and exterior.

Also, various functions have been furthermore realized due to wireless communication being performed with an external device by an ECU that is installed in a vehicle. In the vehicle-mounted network system in JP 2002-261790A as well, a function of performing communication with external devices is included in the vehicle-mounted gateway.

JP 2002-274293A proposes a vehicle management system in which a management computer installed in a vehicle and a vehicle information terminal detachably connected to the management computer are included, and a management computer performs personal verification and the like with an external device based on information registered on a personal ID (Identifier) card that is inserted into the vehicle information terminal.

SUMMARY

Technical Problem

In a communication system having a configuration in which a communication device mounted on a vehicle performs wireless communication with an external device via a device such as a gateway, a security function against unauthorized external access is essential. In the vehicle-mounted network system disclosed in JP 2002-261790A, a firewall is provided in the vehicle-mounted gateway that performs communication with the external device, but this alone is insufficient as a security function. Also, the vehicle management system disclosed in JP 2002-274293A can perform authentication processing and the like based on the information registered in the ID card, but use is cumbersome because it is necessary to perform ID card issuing and processing.

On the other hand, a communication system is proposed in which multiple communication devices are divided into multiple groups; a distribution device (relay device) is provided for each group to connect the communication devices; the multiple distribution devices are connected, thereby configuring a network; storage means are provided in the distribution devices; and data exchanged within a group and between groups can be stored in the storage means of the distribution device (see JP 2009-33251A). This communication system does not take into consideration the fact that wireless communication is performed with external devices, and in terms of security, it is not preferable to have a configuration in which, for example, a communication device or a distribution device individually performs wireless communication with an external device.

Herein provided is a communication system, a relay device, and communication method that enable the realization of an advanced security function in a configuration in which multiple communication devices are divided into groups, a relay device is provided for each group, and the relay devices relay data exchanges between groups.

Solution to Problem

The communication system includes: a plurality of communication device groups, each including a plurality of communication devices; a plurality of first relay devices, one of the first relay devices being provided for each of the communication device groups and including a communication means for exchanging data with any communication device in the corresponding communication device group, a relay means for relaying a data exchange between communication device groups, and a storage means for storing data that is to be relayed; and a second relay device that is connected to the plurality of first relay devices, includes a communication means for exchanging data with the first relay devices, and a wireless communication means for exchanging data wirelessly with an external device, and that relays a data exchange between the external device and the plurality of first relay devices, and the second relay device includes: a selection means for, if the wireless communication means receives data, selecting one or a plurality of the first relay devices from the plurality of the first relay devices; a storage destination storage means for storing the first relay device that was selected by the selection means; a data transmission means for transmitting received data to the first relay device that was selected by the selection means; a data requesting means for, if data is to be transmitted to an external device, making a request to the first relay device that was stored in the storage means, requesting that first relay device to transmit the data; and a data reception means for receiving data transmitted from the first relay device, and the wireless communication means transmits data received by the data reception means to an external device.

Also, in the communication system, each first relay device has a notification means for, if data received from another first relay device or communication device is stored in the storage means, notifying the second relay device that storage has been performed, and in response to the notification from the notification means, the second relay device stores the first relay device specified in the notification in the storage destination storage means as the data storage destination.

Also, in the communication system, the storage destination storage means of the second relay device encrypts and stores information regarding the first relay device that is the storage destination.

Also, in the communication system, the storage means of each first relay device has a common region that stores data that is to be shared with other first relay devices, and an individual region that stores other data, and the first relay devices include: a determination means for determining which of the common region and the individual region to store data received from a communication device in; a means for transmitting data stored in the common region to the other first relay devices; and a means for storing data transmitted from the other first relay devices in the common region.

Also, in the communication system, the first relay devices store data received from the second relay device in the individual region of the storage means.

Also, the relay device is a relay device that is connected to a plurality of first devices, that includes a communication means for exchanging data with the first device, and a wireless communication means for exchanging data wirelessly with a second device, and relays a data exchange between the plurality of first devices and the second device, the relay device including: a selection means for, if the wireless communication means receives data, selecting a storage destination for received data out of the plurality of the first devices; a storage destination storage means for storing the first device that was selected by the selection means; a data transmission means for transmitting received data to the first device that was selected by the selection means; a data requesting means for, if data is to be transmitted to a second device, making a request to the first device that was stored in association with the data in the storage means, requesting that first device to transmit the data; and a data reception means for receiving data transmitted from the first device, and the wireless communication means transmits data received by the data reception means to a second device.

Also, the communication method is a communication method of relaying a data exchange between a plurality of first devices and a second device using a relay device that is connected to the plurality first devices, exchanges data between the first devices, and exchanges data with the second device using wireless communication, the method including: selecting, if data from the second device has been received, a storage destination for the received data out of the plurality of first devices; storing the selected first device; transmitting the received data to the selected first device and requesting, if data is to be transmitted to the second device, the first device that was stored in association with the data to transmit the data; receiving the data that was transmitted from the first device that is the storage destination; and transmitting the received data to the second device.

Multiple communication devices are divided into multiple groups (communication device groups), and a first relay device is provided for each group and connected to the communication devices in the group. The multiple first relay devices that are provided for each group are connected to each other and the first relay devices relay a data exchange between groups of communication devices. Also, a storage means for storing data that is to be relayed is provided in each first relay device. Also, the communication system has a configuration in which a second relay device that performs wireless communication with an external device is provided, the second relay device is connected to the multiple first relay devices, and the second relay device relays data exchanges between an external device and the first relay devices. Security can be strengthened by providing a function such as a firewall in the second relay device.

If data is received from an external device by wireless communication, the second relay device selects a first relay device as the storage destination for the received data. The selection of the first relay device may be performed based on the reception time of the data, it may be performed randomly, it may be performed according to a pre-determined order, or another method may be used. By storing the selected storage destination in the storage destination storage means (in association with information such as data type and reception date and time), the second relay device allows the storage destination of the data to be searched for thereafter. The second relay device transmits the received data to the first relay device that is the selected storage destination, and the first relay device that receives the data stores it in its own storage means.

Also, if data transmission to an external device is to be performed, the second relay device checks which first relay device the transmission target data is stored in by searching for the stored storage destination and makes a request to the first relay device storing the target data to transmit the data. After receiving the transmission request, the first relay device reads out the requested data and transmits it to the second relay device, and the second relay device that received the data transmits the data wirelessly to the external device.

In this way, due to having a configuration in which data that is transmitted and received with an external device is stored so as to be distributed among the storage means of multiple first relay devices, even if the firewall of the second relay device is breached and unauthorized external access is performed, it is difficult for an intruder to distinguish the storage location of data, and therefore information leaks can be prevented. Also, a configuration is possible in which the above-mentioned function of the second relay device is installed in any one of the first relay devices, and in the case of such a configuration, it is possible to keep hardware additions at a minimum since it is sufficient that a wireless transmission function is included in only one of the first relay devices.

Also, if the data received from another first relay device or a communication device is stored in the storage means, the first relay device notifies the second relay device that the data has been stored (in association with information such as type of stored data and storage date and time). After receiving the notification from the first relay device, the second relay device stores the first relay device that is the notification source in the storage destination storage means as the storage destination of the newly-stored data.

Accordingly, the second relay device can wirelessly transmit not only data received from an external device, but also new data generated by a communication device and stored in the first relay device to an external device.

Also, in the present embodiment, the second relay device encrypts information relating to the data storage destination and stores it in the storage destination storage means. Accordingly, it is possible to make it difficult for an unauthorized intruder to specify the data storage location, and to prevent information leaks more reliably.

A common storage region and an individual storage region are provided in the storage means of each first relay device, and data that is to be shared with other groups is stored in the common storage region and other data such as data that is to be used within a group is stored in the individual storage group. The first relay device determines which region to store the data from the communication device in, and if it is determined that the data is to be stored in a common region, the data is transmitted to the other first relay devices. After receiving the data, the other first relay devices store the received data in their own common storage regions. Accordingly, data is shared by the multiple first relay devices.

By having a configuration in which a portion of data is shared in this way, the storage capacity of the storage means in the first relay device can be used efficiently and the communication load among the first relay devices can be reduced.

Also, data that is received from an external device using wireless communication by the second relay device and transmitted from the second relay device to the first relay device is stored in the individual region of the storage means of the first relay device. As described above, since the data that is stored in the common region of the storage means is shared by multiple first relay devices, the data from the second relay device is stored in the individual region and it is thereby possible to make it difficult to specify the data storage location.

Advantageous Effects

It is possible to make it difficult for an unauthorized intruder in a system to specify a data storage location and to realize an advanced security function by having a configuration in which a second relay device stores data transmitted and received with an external device so as to be distributed among storage means included in multiple first relay devices.

DETAILED DESCRIPTION OF THE EMBODIMENTS

Figure 1:
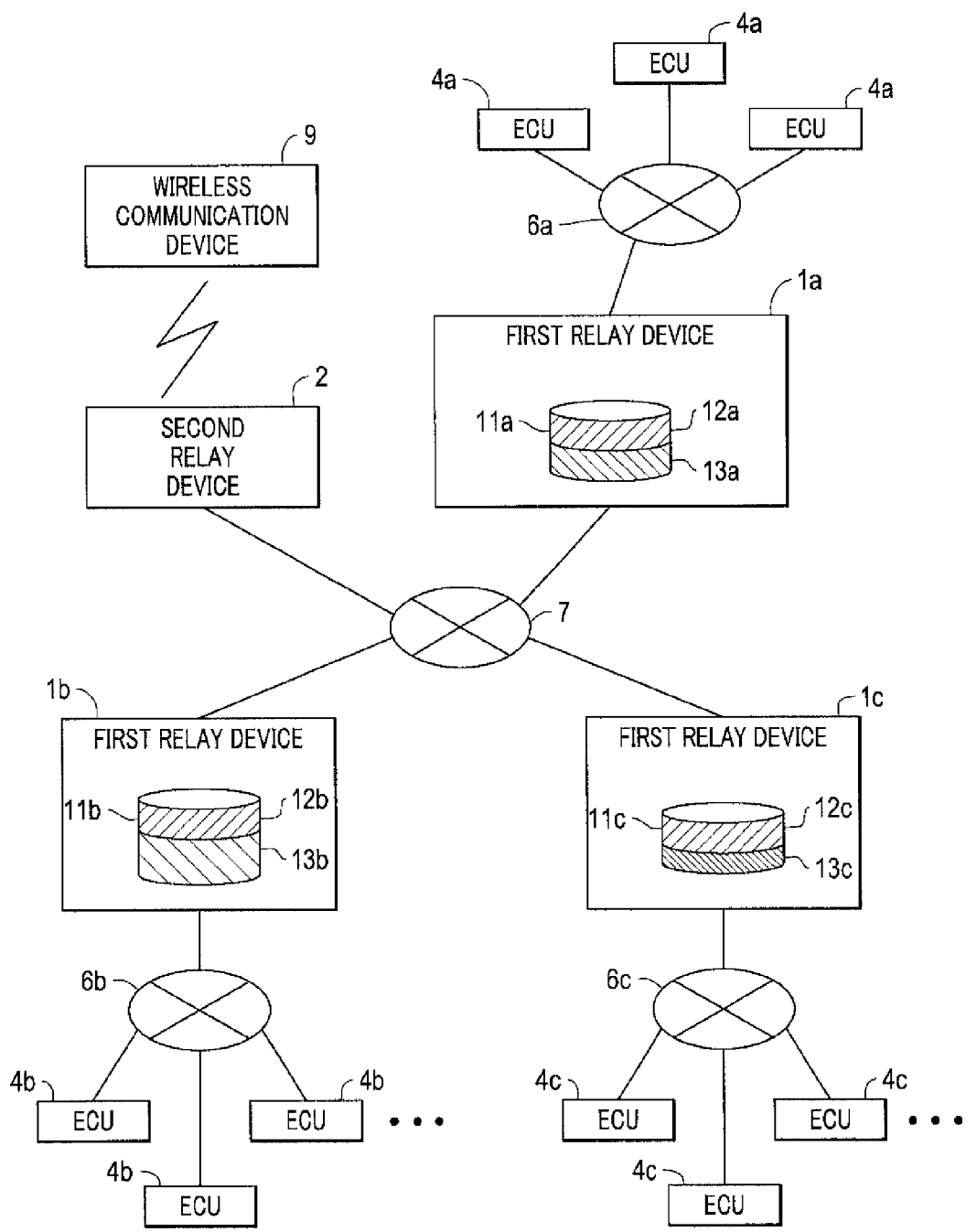
FIG. 1 is a block diagram showing a configuration of a communication system.

FIG. 1 is a block diagram showing a configuration of a communication system. The communication system according to the present embodiment is a system in which multiple ECUs (communication devices) 4 mounted on a vehicle (not shown) perform cooperative operations by mutually transmitting and receiving data, and in addition to the ECUs 4, multiple first relay devices 1 and one second relay device 2 are included and thereby a network is configured. The multiple ECUs 4 are divided into several (in the example illustrated here, there are three, namely a to c) groups (communication device groups), and one first relay device 1 is provided for each group. Note that in FIG. 1, regarding the ECUs 4 and the first relay devices 1, those belonging to group a are denoted by the reference numerals "ECU 4a", "first relay device 1a", and the like, those belonging to group b are denoted by the reference numerals "ECU 4b", "first relay device 1b", and the like, and those belonging to group c are denoted by the reference numerals "ECU 4c", "first relay device 1c", and the like.

The multiple ECUs 4a and the first relay device 1a, which belong to group a, are each connected to a communication line 6a and can exchange data mutually via the communication line 6a. Similarly, the multiple ECUs 4b and the first relay device 1b, which belong to group b are each connected to a communication line 6b, and the multiple ECUs 4c and the first relay device 1c, which belong to group c, are each connected to a communication line 6c. Also, the multiple first relay devices 1a, 1b, and 1c, and the second relay device 2 are each connected to a communication line 7 and can mutually exchange data via the communication line 7. The second relay device 2 includes a function of performing wireless communication and can exchange data wirelessly with an external wireless communication device 9. The first relay devices 1a, 1b, and 1c relay data exchanges between groups, and the second relay device 2 relays data exchanges between the external wireless communication device 9 and the first relay devices 1a, 1b, and 1c (and moreover, between the wireless communication device 9 and the ECUs 4a, 4b, and 4c in the groups).

Note that various connection configurations (topologies) such as a bus type, a star type, or a daisy chain type can be employed as the connection configuration of the network constituted by the communication line 6a between the ECUs 4a and the first relay device 1a. The same applies to the connection configuration of the network constituted by the communication line 6b between the ECUs 4b and the first relay device 1b, and to the connection configuration of the network constituted by the communication line 6c between the ECUs 4c and the first relay device 1c. Also, the same applies to the connection configuration of the network constituted by the communication line 7 between the first relay devices 1a, 1b, and 1c, and the second relay device 2.

The first relay devices 1a, 1b, and 1c include storage regions that are to be used as databases 11a, 11b, and 11c respectively. The first relay devices 1a, 1b, and 1c basically store data transmitted from the ECUs 4a, 4b, and 4c that are connected via the communication lines 6a, 6b, and 6c, and transmit data read out from the databases 11a, 11b, and 11c in response to requests from the ECUs 4a, 4b, and 4c.

The ECUs 4a, 4b, and 4c are devices that perform detection and/or calculation of various types of physical amounts such as measured values, calculated values, and/or control values, and are capable of transmitting data that includes numeric value information of the various types of physical amounts while performing control of the engine, brakes, various loads, and sensors of the vehicle based on the various physical amounts. For example, one ECU 4a realizes a function for a vehicle ABS (Anti-lock Brake System), has a sensor that detects the wheel rotation speed (wheel speed), controls the brake based on the wheel speed detected by the sensor, and transmits data that includes the measured value of the wheel speed to the first relay device 1a.

Here, if the wheel speed data that was transmitted from the ECU 4a is to be used by the ECUs 4b and 4c that are connected to the other communication lines 6b and 6c, the first relay device 1a transmits the wheel speed data to the other first relay devices 1b and 1c. The other first relay devices 1b and 1c receive the wheel speed data, store it in the databases 11b and 11c, and transmit it to the ECUs 4b and 4c that are connected via the communication lines 6b and 6c.

In this way, the first relay devices 1a, 1b, and 1c receive the data transmitted from the ECUs 4a, 4b, and 4c, store it in their own databases 11a, 11b, and 11c, and transmit it to the other first relay devices 1a, 1b, and 1c. Also, if data from the other first relay devices 1a, 1b, and 1c is received, the first relay devices 1a, 1b, and 1c store the received data in their own databases 11a, 11b, and 11c, and transmit it to the ECUs 4a, 4b, and 4c. Accordingly, all of the content of the databases 11a, 11b, and 11c included in the first relay devices 1a, 1b, and 1c can be synchronized, and identical data can be used among the ECUs 4a, 4b, and 4c connected to the different communication lines 6a, 6b, and 6c.

Also, in this case, the data transmitted by the ECUs 4a, 4b, and 4c is stored once in the databases 11a, 11b, and 11c of the first relay devices 1a, 1b, and 1c, and thereby it is possible to optimize the timing of data transmission from the first relay devices 1a, 1b, and 1c to the ECUs 4a, 4b, and 4c according to the processing in each device, to transmit data in combination according to the processing in the ECUs 4a, 4b, and 4c, and/or to perform a data calculation in the first relay devices 1a, 1b, and 1c according to need and subsequently transmit the calculation result. In this way, data can be transmitted efficiently from the first relay devices 1a, 1b, and 1c to the ECUs 4a, 4b, and 4c, and therefore the communication load in the communication lines 6a, 6b, and 6c can be reduced.

Note that it is not necessary for all of the content in the databases 11a, 11b, and 11c of the first relay devices 1a, 1b, and 1c to be the same content. Depending on the type of data transmitted from the ECUs 4a, 4b, and 4c, some data is not used by the ECUs 4a, 4b, and 4c that are connected to the different communication lines 6a, 6b, and 6c. For example, there are cases where the wheel speed data that is transmitted from one ECU 4a is used by the ECU 4a that is connected to a communication line 3a, but is not used by the ECUs 4b and 4c that are connected to other communication lines 3b and 3c. In a configuration where this kind of data is stored in all of the databases 11a, 11b, and 11c of the first relay devices 1a, 1b, and 1c, storage regions are allocated to data that is never used, and therefore needless use of the storage regions occurs.

In view of this, in the communication system of the present embodiment, in the databases 11a, 11b, and 11c of the first relay devices 1a, 1b, and 1c, a distinction is made between common regions 12a, 12b, and 12c that store data that is to be stored in each of the first relay devices 1a, 1b, and 1c, and individual regions 13a, 13b, and 13c that store other data. The first relay devices 1a, 1b, and 1c mutually transmit and receive the data stored in the common regions 12a, 12b, and 12c and synchronize its content. Also, the first relay devices 1a, 1b, and 1c store data that is to be used only by the ECUs 4a, 4b, and 4c belonging to the same group in the individual regions 13a, 13b, and 13c.

Also, the communication system according to the present embodiment can perform wireless communication via a public wireless communication network with an external wireless communication device 9. Wireless data exchanges with the wireless communication device 9 are performed only by the second relay device 2. If the second relay device 2 receives data from the external wireless communication device 9, one of the first relay devices 1a, 1b, and 1c that is connected via the communication line 7 is selected, and the received data is transmitted to one of the first relay devices 1a, 1b, and 1c. The selection of the first relay devices 1a, 1b, and 1c by the second relay device 2 may be performed randomly, for example. It may be performed according to the data reception time, for example. It may be performed according to a predetermined order, for example. The selection also may be performed using another method. After receiving the data from the second relay device 2, one of the first relay devices 1a, 1b, and 1c stores the received data in the individual region 13a, 13b, or 13c in the database 11a, 11b, or 11c.

The second relay device 2 holds corresponding information about what type of data is stored in the database 11a, 11b, or 11c of the first relay device 1a, 1b, or 1c as a table (data storage destination table). If the second relay device 2 causes the data received from the external wireless communication device 9 to be transmitted to one of the first relay devices 1a, 1b, and 1c and stored in the database 11a, 11b, or 11c, the data storage destination table is updated (i.e., one of the first relay devices 1a, 1b, and 1c that was selected as a storage destination for received data is registered in the data storage destination table). Also, if the data is stored in the database 11a, 11b, or 11c of the first relay devices 1a, 1b, and 1c (including the case where the data is changed and the case where the data is deleted), the second relay device 2 is notified of that fact, and the second relay device 2 updates the data storage destination table according to the notification.

Also, the second relay device 2 performs transmission of data to the external wireless communication device 9 in response to a request from the external wireless communication device 9, at its own discretion, or in response to a request from the first relay devices 1a, 1b, and 1c, or the ECUs 4a, 4b, and 4c. If data transmission is to be performed, the second relay device 2 references the data storage destination table in order to specify the first relay device 1a, 1b, or 1c storing the data that is to be transmitted and provides the data transmission request to that first relay device 1a, 1b, or 1c. The first relay device 1a, 1b, or 1c that received the request reads out the desired data from the database 11a, 11b, or 11c, transmits it to the second relay device 2, and the second relay device 2 receives it and wirelessly transmits it to the external wireless communication device 9.

The data storage destination table that is held by the second relay device 2 is encrypted, and only the second relay device 2 can read out information from and update the data storage destination table. Note that the storage destination need not be registered in the data storage destination table for all data stored in the databases 11a, 11b, and 11c of all of the first relay devices 1a, 1b, and 1c and it is only necessary that at least the storage destination is registered in the data storage destination table for data that may possibly be exchanged with the external wireless communication device 9 by the second relay device 2.

Also, since a configuration is used in which the second relay device 2 selects the storage destination of the data received from the external wireless communication device 9, if the storage destination is selected randomly, for example, the first relay device 1a, 1b, or 1c in the group that is to use the data will not necessarily be selected. Because of this, in the case where data is requested by the ECUs 4a, 4b, or 4c, if the requested data is stored in the database 11a, 11b, or 11c of the first relay device 1a, 1b, or 1c, it is read out and transmitted to the ECUs 4a, 4b, or 4c. If the requested data is not stored in its own database 11a, 11b, or 11c, the first relay device 1a, 1b, or 1c makes a request to the second relay device 2 to transmit the data. The second relay device 2 searches for the storage destination of the requested data by referencing the data storage request table, reads out the data from the first relay device 1a, 1b, or 1c, and transmits it to the first relay device 1a, 1b, or 1c that is the request source.

By storing data that is to be exchanged with the external wireless communication device 9 so as to be distributed among the databases 11a, 11b, and 11c of the multiple first relay devices 1a, 1b, and 1c, it is possible to make it difficult for an unauthorized intruder in the communication system to specify of the storage location of data.

Figure 2:
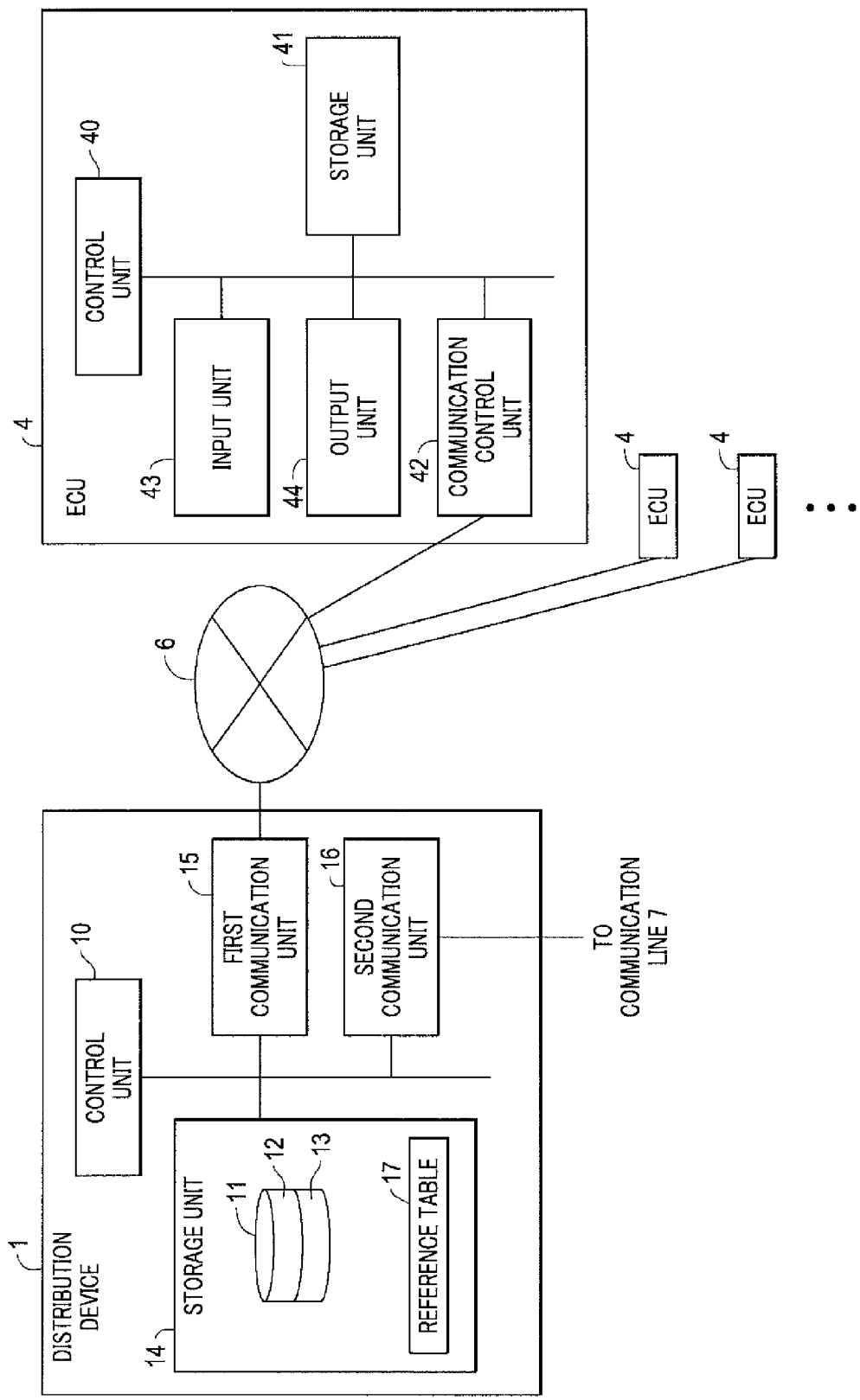
FIG. 2 is a block diagram showing a configuration of a first relay device and an ECU.

FIG. 2 is a block diagram showing a configuration of a first relay device 1 and an ECU 4. The first relay device 1 (1a, 1b, 1c) has a configuration including a control unit 10 that controls the operation of below-described constituent elements, a storage unit 14 that uses a volatile memory, a first communication control unit 15 that is connected to the communication line 6, and a second communication control unit 16 that is connected to the communication line 7. The control unit 10 is specifically a calculation processing device such as a CPU (Central Processing Unit) or an MPU (Micro Processing Unit), receives a supply of power from a power supply device such as a battery or an alternator installed in the vehicle, and performs control of the constituent elements by reading out and executing a control program stored in advance in a non-volatile built-in memory (not shown).

A storage region for the database 11 that stores data received from the ECUs 4, another first relay device 1, or the second relay device 2 is provided in the storage unit 14. The control unit 10 stores corresponding specific measured values, calculated values, control values, or the like in the database 11 according to data type such as "wheel speed", based on the received data. The database 11 is divided into the common region 12 and the individual region 13, and the control unit 10 determines whether the data received from the ECU 4 is to be stored in the common region 12 or the individual region 13. Because of this, the reference table 17 that shows which region to store data in is stored in the storage unit 14 for each type of data received from the ECU 4. Note that the reference table 17 may have a configuration in which it is stored in the storage region 14 separate from the database 11 as shown in FIG. 2, and it may have a configuration in which it is stored in the common region 12 in the database 11, thereby allowing identical content to be stored alike by each of the multiple first relay devices 1. Also, the reference table 17 need not only be in a table format and may be listed according to an index in the database 11 for each type of data.

Figures 3, 4:
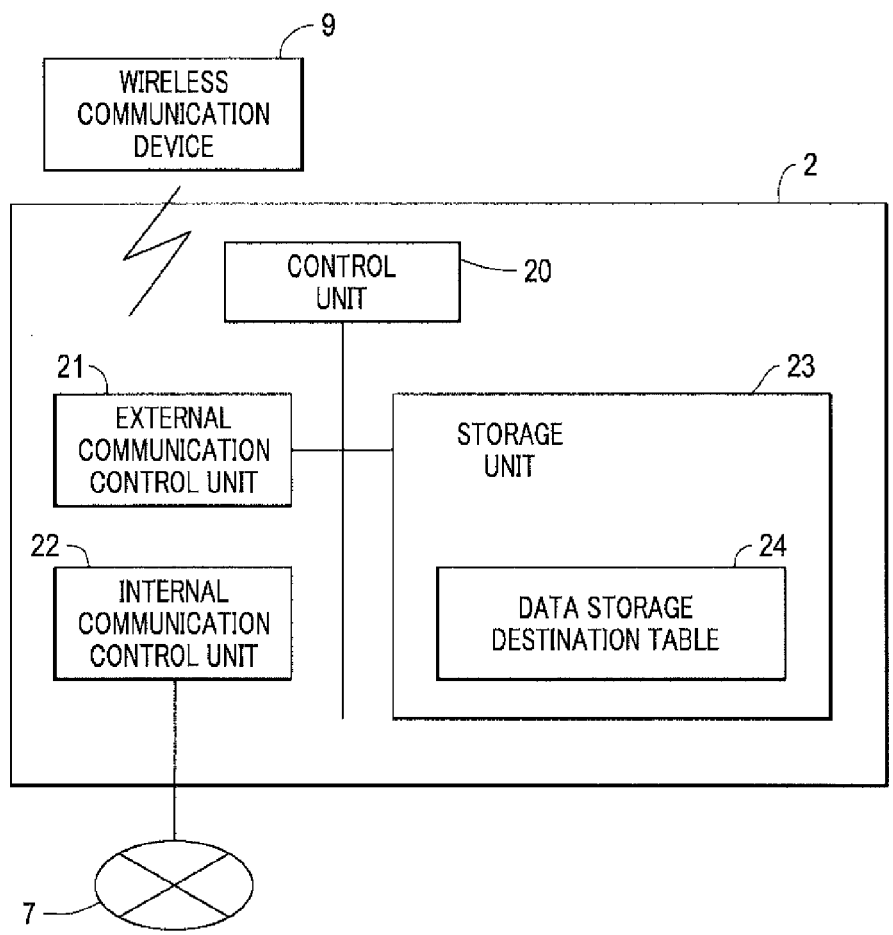
FIG. 3 is a schematic view showing an example of content in a reference table.
FIG. 4 is a block diagram showing a configuration of a second relay device.

FIG. 3 is a schematic view showing an example of the content of the reference table 17, and the content of the first relay device 1a is shown as an example. As shown in the present drawing, regions in which data is to be stored according to type are shown in the reference table 17. The example illustrated here shows that wheel speed data and steering angle data are to be stored in the common region 12, oil temperature data is to be stored in an individual region 13a in the first relay device 1a, and interior temperature data is to be stored in an individual region 13b in the first relay device 1b. In this way, in the case of the present example, the reference table 17 of the first relay device 1a indicates that the interior temperature data is to be stored in the individual region 13b of the other first relay device 1b. Accordingly, if an interior temperature data transmission request is received from the ECU 4a, the control unit 10 of the first relay device 1a refers to the reference table 17, thereby recognizing that the interior temperature data is not stored in the database 11a and that the interior temperature data is stored in the individual region 13b of the database 11b in the first relay device 1b, and therefore, is to be acquired from the first relay device 1b. However, the present invention is not limited to this, and a configuration is possible in which the information regarding the data that is to be stored in the individual regions 13a and 13b of the other first relay devices 1b and 1c is not included in the reference table 17 of the first relay device 1a.

The first communication control unit 15 of the first relay device 1 realizes data exchange with the ECU 4 that is connected via the communication line 6. In accordance with control by the control unit 10, the first communication control unit 15 transmits data to the ECU 4 and performs notification of the reception of data to the control unit 10 when data is received from the ECU 4. Also, a second communication control unit 16 realizes data exchanges between the second relay device 2 and another first relay device 1 that is connected via the communication line 7. In accordance with control by the control unit 10, the second communication control unit 16 performs data transmission to the other first relay devices 1 or the second relay device 2 and performs notification of the reception of data to the control unit 10 when data is received from the other first relay devices 1 or the second relay device 2.

Also, the ECU 4 (4a, 4b, 4c) has a configuration that includes a control unit 40 that controls the operation of later-described constituent elements, a storage unit 41 that uses a rewriteable non-volatile memory, a communication control unit 42 that is connected to the communication line 6, an input unit 43 that receives input of signals from a sensor (not shown), and an output unit 44 that outputs control signals to a control target device (not shown). Note that depending on the type of the ECU 4, a configuration is possible in which only one of the input unit 43 or the output unit 44 is included.

The control unit 40 receives a supply of power via a power source circuit (not shown) from a power supply device such as a battery or alternator installed in the vehicle, detects a signal indicating a measured value from the sensor connected to the input unit 43, performs calculation processing using the detection result, and outputs a control signal to the control target that is connected to the output unit 44 according to the processing result. The storage unit 41 temporarily stores data such as measured values indicated by the signal that was input from the sensor or based on various types of information generated during the processing of the control unit 40.

The communication control unit 42 realizes data exchanges with the first relay device 1 (and another ECU 4) that is connected via the communication line 6. The control unit 40 of the ECU 4 detects a signal from the sensor every fixed time interval of one millisecond for example, and transmits the data including numerical values of physical amounts indicated by the detected signals in the communication control unit 42. Also, when data is received from the first relay device 1, the communication control unit 42 performs notification of the reception to the control unit 40.

FIG. 4 is a block diagram showing a configuration of the second relay device 2. The second relay device 2 has a configuration including a control unit 20 that controls the operation of below-described constituent elements, an external communication control unit 21 that performs wireless communication with the external wireless communication device 9, an internal communication control unit 22 that is connected to the communication line 7, and a storage unit 23 that uses a volatile memory. The control unit 20 is specifically a calculation processing device such as a CPU or an MPU, and it receives a supply of power from a power supply device such as a battery or an alternator that is mounted to the vehicle, and performs control of the constituent elements by reading out and executing a control program stored in advance in a non-volatile built-in memory (not shown).

The external communication control unit 21 exchanges data with the external wireless communication device 9 via a public wireless communication network such as a mobile phone network or a public LAN (Local Area Network). There need not be only one wireless communication device 9, and it may be a server device of a dealer, maker or the like of the vehicle, a server device of a maker of an electronic device that is installed in the vehicle, various types of devices such as a computer installed in the home of the user of the vehicle, or the like. Accordingly, the states of the engine, brakes, and the like of the vehicle are detected and transmitted periodically to a server device of a dealer, and thereby the dealer can know the state of the vehicle and notify the user of abnormalities in the vehicle, for example. Also, for example, it is possible to realize processing such as updating control information by receiving information regarding engine control of the vehicle from an external server device, or performing an update by receiving map information for a car navigation device from an external server.

The internal control unit 22 realizes data exchange between the first relay device 1 that is connected via the communication line 7. If data is received from the external wireless communication device 9, the control unit 20 of the second relay device 2 transmits the data to the first relay device 1 using the internal communication unit 22 and transmits the data received from the first relay device 1 to the external wireless communication device 9 using the internal communication control unit 22.

The storage unit 23 temporarily stores various types of information generated during the processing of the control unit 20, data received by the external communication control unit 21 from the wireless communication device 9, data received by the internal communication control unit 22 from the first relay device 1, and the like. Also, the storage unit 23 stores a data storage destination table 24 that includes information indicating which first relay device 1 has the data that was received from the external wireless communication device 9 stored in the database 11.

If data is received from the external wireless communication device 9, the second relay device 2 temporarily stores received data in the storage unit 23, selects one of the first relay devices 1 from the multiple first relay devices 1 that are connected via the communication line 7 as the storage destination that is to officially store the data, and by transmitting the data received from the vehicle exterior to the selected first relay device 1, causes the data received by the database 11 of the first relay device 1 to be stored. At this time, the second relay device 2 stores the storage destination of the received data in the data storage destination table 24. Note that the information in the data storage destination table 24 is encrypted, and the control unit 20 of the second relay device 2 performs encryption and decryption of information when information is written in or read out from the data storage destination table 24.

The control unit 20 of the second relay device 2 can have a configuration in which the selection of the storage destination for the received data is performed randomly, for example. In this case, a function of generating a random number is provided in the control unit 20. Also, a configuration is possible in which the control unit 20 performs selection of the storage destination based on the data reception time, for example. In this case, a time measuring function is provided in the control unit 20 and the storage destination is selected according to a remainder obtained by dividing the number of seconds of the reception time by the number of first communication devices 1. Also, a configuration is possible in which the control unit 20 performs the selection of the storage destination in accordance with a pre-determined order. In this case, the storage destination selection order is stored in advance in the storage unit 23 as a table or the like, and the control unit 20 selects a storage destination by reading out the table. Note that the selection of the storage destination performed by the control unit 20 may be a method other than those described above.

Figures 5, 6:
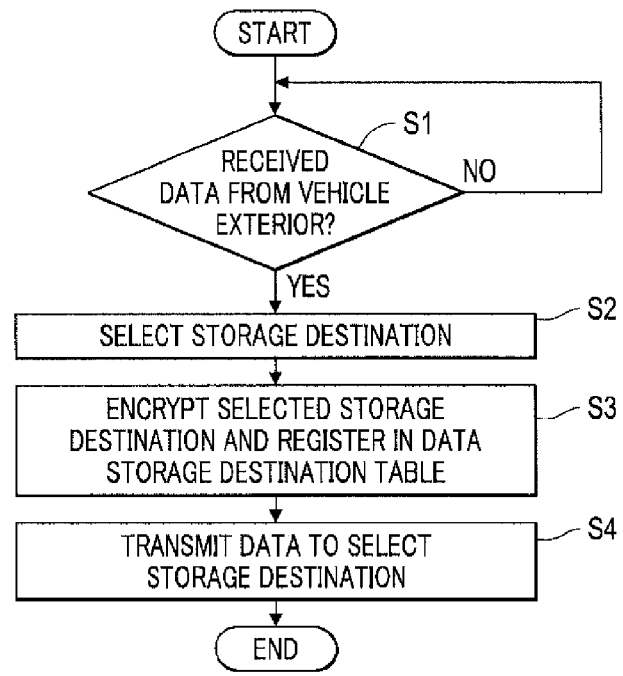
FIG. 5 is a schematic view showing an example of content in a data storage destination table.
FIG. 6 is a flowchart showing a procedure of processing performed in the case where the second relay device receives data from the vehicle exterior.

FIG. 5 is a schematic view showing an example of the content in the data storage destination table 24. As shown in the present drawing, (identification information that enables identification of) the first relay devices 1a to 1c storing the received data are stored with respect to the received data (not the received data itself but identification information that enables the received data to be identified) received by the second relay device 2 in the data storage destination table 24. The example illustrated in the drawing shows that received data A is stored in the first relay device 1a, received data B is stored in the first relay device 1c, received data C is stored in the first relay device 1b, and received data D is stored in the first relay device 1a. Note that the data received from the vehicle exterior is stored in the individual region 13 of the database 11 in the first relay device 1.

Also, information relating to the data storage destination is stored in the data storage destination table 24 not only for data received from the external wireless communication device 9, but for data generated by the internal ECU 4 (and transmitted to the outside of the vehicle) as well. The example illustrated in the drawing shows that oil temperature data is stored in the first relay device 1a, interior temperature data is stored in the first relay device 1b, and wheel speed data is stored in the common regions 12a, 12b, and 12c of all of the first relay devices 1a, 1b, and 1c.

Because of this, if data from the ECUs 4 is received and stored in the databases 11, the first relay devices 1 notify the second relay device 2 that data storage has been performed. After receiving the notification, the control unit 20 of the second relay device 2 updates the data storage destination table 24 of the storage unit 23.

Note that since the data received from the external wireless communication device 9 is stored in one of the first relay devices 1 selected by the second relay device 2 using a method of random selection or the like, it is not necessarily the case that it is stored in the first relay device 1 in a group that needs the received information. Because of this, after receiving a request for the received data from the ECU 4, the first relay device 1 makes a request to the second relay device 2 for the received data if the received data is not stored in its own database 11. In response to this request, the second relay device 2 refers to the data storage destination table 24 in order to specify the storage destination of the desired received data, acquires the received data from the storage destination, transmits it to the first relay device 1 that needs the data, and the data is transmitted from the first relay device 1 to the ECU 4.

Also, if the data is to be transmitted from the second relay device 2 to the external wireless communication device 9, the control unit 20 of the second relay device 2 refers to the data storage destination table 24 of the storage unit 23, selects the storage destination of the data that is to be sent, and provides the transmission request for the data to the first relay device 1 that is the storage destination. After receiving the request, the first relay device 1 reads out the desired data from its own database 11 and transmits it to the second relay device 2. The control unit 20 of second relay device 2 that received the data wirelessly transmits the data to the external wireless communication device 9 using the external communication control unit 21.

FIG. 6 is a flowchart showing a procedure of processing that is performed in the case where the second relay device 2 receives data from the vehicle exterior. The control unit 20 of the second relay device 2 determines whether or not the data from the external wireless communication device 9 has been received by the vehicle-exterior communication control unit 21 (step S1), and if the data from the vehicle exterior has not been received (step S1: NO), the procedure waits until the data is received. If the data from the vehicle exterior has been received (step S1: YES), the control unit 20 selects the storage destination for the received data from the multiple first relay devices 1 that are connected via the communication line 7 (step S2).

Next, the control unit 20 encrypts the information relating to the first relay device 1 for the selected storage destination, registers it in the data storage destination table 24 of the storage unit 23 (step S3), transmits the data received from the vehicle exterior to the first relay device 1 for the selected storage destination (step S4), and causes the received data to be stored in the database 11 of the first relay device 1, and the processing ends.

Figure 7:
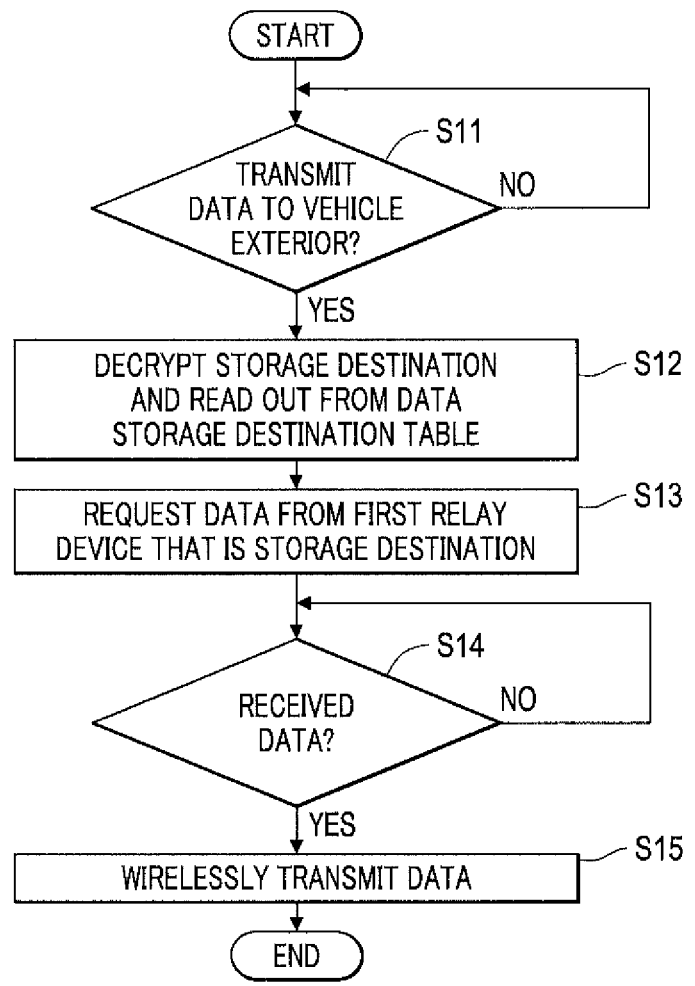
FIG. 7 is a flowchart showing a procedure of processing performed in the case where the second relay device transmits data to the vehicle exterior.

FIG. 7 is a flowchart showing a procedure of processing that is performed in the case where the second relay device 2 transmits data to the vehicle exterior. If the wireless communication device 9 requests data to be transmitted, if a predetermined data transmission period has been reached, or if a data transmission request is obtained from the first relay device 1 or the ECU 4, the control unit 20 of the second relay device 2 performs wireless transmission of data to the vehicle exterior using the external communication control unit 21. The control unit 20 determines whether or not to transmit data to the vehicle exterior based on the above conditions (step S11), and if it is determined that data transmission is not to be performed (step S11: NO), the procedure waits until when any of the conditions is satisfied and data transmission is to be performed.

If it is determined that data transmission is to be performed (step S11: YES), the control unit 20 decrypts the storage destination for the data that is to be transmitted and reads it out from the data storage destination table 24 of the storage unit 24 (step S12), and makes a request to the first relay device 1 that is the storage destination to transmit the data (step S13). After obtaining the data transmission request from the second relay device 2, the first relay device 1 reads out the desired data from the database 11 and transmits it to the second relay device 2.

The control unit 20 of the second relay device 2 determines whether or not the desired data has been received from the first relay device 1 that is the storage destination (step S14) and if the data has not been received (step S14: NO), the procedure waits until the data is received. If the data from the first relay device 1 has been received (step S14: YES), the control unit 20 provides the data to the external communication control unit 21, transmits it wirelessly to the external wireless communication device 9 (step S15), and the processing ends.

Figure 8:
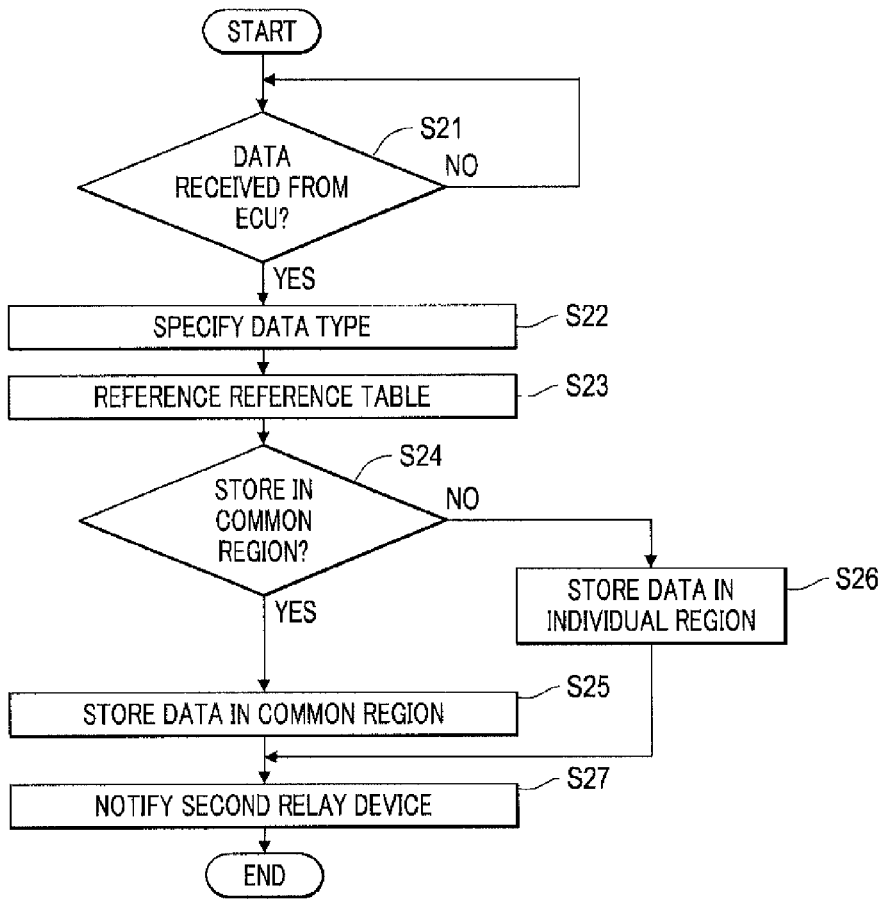
FIG. 8 is a flowchart showing a procedure of processing performed in the case where the first relay device receives data from the ECU.

FIG. 8 is a flowchart showing a procedure of processing that is performed in the case where the first relay device 1 receives data from an ECU. The control unit 10 of the first relay device 1 determines whether or not the data has been received from one of the ECUs 4 that are connected via the communication line 6 (step S21), and if data has not been received from any of the ECUs 4 (step S21: NO), standby is performed until data is received. If data has been received from any of the ECUs 4 (step S21: YES), the control unit 10 specifies the type of the received data (step S22), references the reference table 17 in the storage unit 14 (step S23), and determines whether or not the data is to be stored in the common region 12 of the database 11 based on the specified data type (step S24).

If it is determined that the data is to be stored in the common region 12 in the database 11 (step S24: YES), the control unit 10 stores the data received from the ECU 4 in the common region 12 of the database 11 (step S25). Additionally, if it is determined that the data is not to be stored in the common region 12 (step S24: NO), the control unit 10 stores the data received from the ECU 4 in the individual region 13 of the database 11 (step S26). After storing the data in step S25 or step S26, the control unit 10 notifies the second relay device 2 that data storage has been performed (step S27), and the processing ends.

Figure 9:
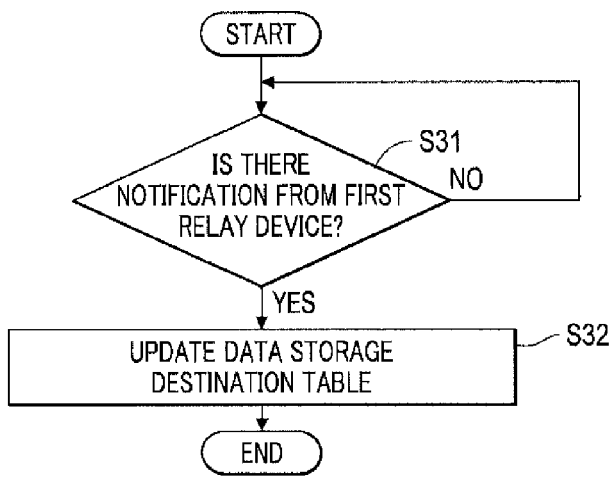
FIG. 9 is a flowchart showing a procedure of processing performed in the case where the second relay device receives a data storage notification from the first relay device.

FIG. 9 is a flowchart showing a procedure of processing that is performed in the case where the second relay device 2 receives a data storage notification from the first relay device 1. The control unit 20 of the second relay device 2 determines whether or not a notification that data has been stored in the database 11 has been received from any of the first relay devices 1 that are connected via the communication line 7 (step S31), and if no notification has been received (step S31: NO), standby is performed until a notification is received. If the notification that data storage has been performed has been received from any of the first relay devices (step S31: YES), the control unit 10 performs an update based on the notification by adding the new data and storage destination to the data storage destination table 24 in the storage unit 23 (step S32), and the processing ends.

In a communication system with the above configuration, data transmitted or received by the second relay device 2 with the external wireless communication device 9 is stored so as to be distributed among the databases 11 of the multiple first relay devices 1, and thereby, in the case of unauthorized external access into a vehicle communication system as well, it is possible to make it difficult for an intruder to specify the data storage location. Therefore, information leaks can be prevented. Also, information leaks can be prevented more reliably by storing data received from the vehicle-exterior wireless communication device 9 in the individual region 13 of the database 11 in the first relay device 1 and by encrypting the data storage destination table 24 in the second relay device 2.

Due to having a configuration where, if the first relay devices 1 store the data received from the ECUs 4 in the databases 11, the second relay device 2 is notified and the second relay device 2 updates the data storage destination table 24 in response to the notification—the second relay device 2 can know the first relay device 1 that is the storage destination not only for the data received from the external wireless communication device 9, but also for the data generated by the internal ECUs 4, and can transmit these pieces of data to the wireless communication device 9.

Note that in the present embodiment, a configuration is used in which data received from the external wireless communication device 9 is stored in the individual region 13 in the database 11 of the first relay device 1, but this is not always the case, and the data may be stored in the common region 12. Additionally, a configuration is used in which data received from the wireless communication device 9 is stored in the database 11 of any one of the first relay devices 1. But this is not always the case, and a configuration may be used in which data received from the wireless communication device 9 is divided and stored in the databases 11 of multiple first relay devices 1. Also, a firewall function may be provided in the second relay device 2. Additionally, in the present embodiment, an example was given in which the communication system is mounted on a vehicle, but this is not always the case. It is possible to use a communication system that is mounted on various types of moving bodies such as a ship or an airplane, for example, or another communication system may be used.

REFERENCE SIGNS LIST

1 First relay device (first device)
2 Second relay device
4 ECU (communication device)
6, 7 Communication lines
9 Wireless communication device (external device, second device)
10 Control unit (relay means, notification means, determination means)
11 Database (storage means)
12 Common region
13 Individual region
14 Storage unit
15 First communication control unit (communication means, relay means)
16 Second communication control unit (relay means, notification means)
17 Reference table
20 Control unit (selection means, data transmission means, data requesting means, data reception means)
21 External communication control unit (wireless communication means)
22 Internal communication control unit (communication means, data transmission means, data requesting means, data reception means)
23 Storage unit
24 Data storage destination table (storage destination storage means)
40 Control unit
41 Storage unit
42 Communication control unit
43 Input unit
44 Output unit

The invention claimed is:

1. A communication system comprising:
a plurality of communication device groups, each including a plurality of communication devices;
a plurality of first relay devices, one of the first relay devices being provided for each of the communication device groups and including a communication means for exchanging data with any communication device in the corresponding communication device group, a relay means for relaying a data exchange between communication device groups, and a storage means for storing data that is to be relayed; and
a second relay device (i) that is connected to the plurality of first relay devices, (ii) includes a communication means for exchanging data with the first relay devices, and a wireless communication means for wirelessly exchanging data with an external device, and (iii) that relays a data exchange between the external device and the plurality of first relay devices, wherein
the second relay device includes:
a selection means for, if the wireless communication means receives data, selecting one or a plurality of the first relay devices from the plurality of first relay devices,
a storage destination storage means for storing the first relay device that was selected by the selection means,
a data transmission means for transmitting received data to the first relay device that was selected by the selection means,
a data requesting means for, if data is to be transmitted to an external device, making a request to the first relay device that was stored in the storage means, requesting that first relay device to transmit the data, and
a data reception means for receiving data transmitted from the first relay device,
and the wireless communication means transmits data received by the data reception means to the external device.

2. The communication system according to claim 1,
wherein each first relay device has a notification means for, if data received from another first relay device or communication device is stored in the storage means, notifying the second relay device that storage has been performed, and
the second relay device, in response to the notification from the notification means, stores the first relay device specified in the notification in the storage destination storage means as a data storage destination.

3. The communication system according to claim 2,
wherein the storage destination storage means of the second relay device encrypts and stores information regarding the first relay device that is the storage destination.

4. The communication system according to claim 3,
wherein the storage means of each first relay device has a common region that stores data that is to be shared with other first relay devices, and an individual region that stores other data, and
the first relay devices include
a determination means for determining in which of the common region and the individual region to store data received from a communication device,
a means for transmitting data stored in the common region to the other first relay devices, and
a means for storing data transmitted from the other first relay devices in the common region.

5. The communication system according to claim 4,
wherein the first relay devices store data received from the second relay device in the individual region of the storage means.

6. The communication system according to claim 2,
wherein the storage means of each first relay device has a common region that stores data that is to be shared with other first relay devices, and an individual region that stores other data, and
the first relay devices include
a determination means for determining in which of the common region and the individual region to store data received from a communication device,
a means for transmitting data stored in the common region to the other first relay devices, and
a means for storing data transmitted from the other first relay devices in the common region.

7. The communication system according to claim 6,
wherein the first relay devices store data received from the second relay device in the individual region of the storage means.

8. The communication system according to claim 1,
wherein the storage destination storage means of the second relay device encrypts and stores information regarding the first relay device that is the storage destination.

9. The communication system according to claim 8,
wherein the storage means of each first relay device has a common region that stores data that is to be shared with other first relay devices, and an individual region that stores other data, and the first relay devices include
- a determination means for determining in which of the common region and the individual region to store data received from a communication device,
- a means for transmitting data stored in the common region to the other first relay devices, and
- a means for storing data transmitted from the other first relay devices in the common region.

10. The communication system according to claim 9, wherein the first relay devices store data received from the second relay device in the individual region of the storage means.

11. The communication system according to claim 1, wherein the storage means of each first relay device has a common region that stores data that is to be shared with other first relay devices, and an individual region that stores other data, and
the first relay devices include
- a determination means for determining in which of the common region and the individual region to store data received from a communication device,
- a means for transmitting data stored in the common region to the other first relay devices, and
- a means for storing data transmitted from the other first relay devices in the common region.

12. The communication system according to claim 11, wherein the first relay devices store data received from the second relay device in the individual region of the storage means.

13. A relay device that (i) is connected to a plurality of first devices, (ii) includes a communication means for exchanging data with the first devices, and a wireless communication means that exchanges data wirelessly with a second device, and (iii) relays a data exchange between the plurality of first devices and the second device, the relay device comprising:
- a selection means for, if the wireless communication means receives data, selecting a storage destination for received data out of the plurality of first devices;
- a storage destination storage means for storing the first device that was selected by the selection means;
- a data transmission means for transmitting received data to the first device that was selected by the selection means;
- a data requesting means for, if data is to be transmitted to a second device, making a request to the first device that was stored in association with the data in the storage destination storage means, requesting the first device to transmit the data; and
- a data reception means for receiving data transmitted from the first device,
wherein the wireless communication means transmits data received by the data reception means to a second device.

14. A communication method of relaying a data exchange between a plurality of first devices and a second device using a relay device that (i) is connected to the plurality of first devices, (ii) exchanges data between the first devices, and (iii) exchanges data with the second device using wireless communication, the method comprising:
- selecting, if data from the second device has been received, a storage destination for the received data out of the plurality of first devices;
- storing the selected first device,
- transmitting the received data to the selected first device;
- requesting, if data is to be transmitted to the second device, the first device that was stored in association with the data to transmit the data;
- receiving the data that was transmitted from the first device that is the storage destination; and
- transmitting the received data to the second device.

* * * * *